3,129,229
TESTOLOLACTONES

Robert S. Robison, North Brunswick, and Edward J. Becker, Princeton, N.J., assignors to Olin Mathieson Chemical Corporation, New York, N.Y., a corporation of Virginia
No Drawing. Filed Jan. 29, 1963, Ser. No. 254,611
10 Claims. (Cl. 260—343.2)

This invention relates to and has for its object, the provision of new compounds of the formulae

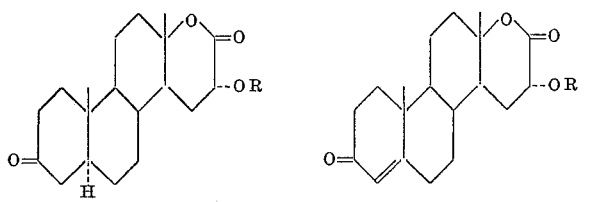

and

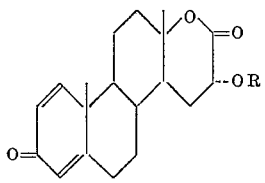

wherein R is lower alkyl.

The compounds of this invention are pharmacologically active substances, which, unlike testololactone, possess anti-androgenic activity and may be employed in place of such known antiandrogenic steroids as A-norprogesterone in the treatment of such conditions as hyperandrogenic acne. The compounds of this invention may be formulated for such administration, the concentration and/or dosage being based on the activity of the particular compound and the requirements of the patient.

The final products of this invention are prepared by the process of this invention which entails a number of steps beginning with 16α-hydroxy-Δ¹-testololactone as a starting material.

In the first step of the process of this invention, 16α-hydroxy-Δ¹-testololactone is alkylated as by treatment with an alkyl halide, such as methyl iodide or ethyl iodide, to yield the 16α-alkoxy-Δ¹-testololactone, which is also a new compound of this invention.

The 16α-alkoxy-Δ¹-testololactone is then reduced as by treatment with a palladium on charcoal catalyst in a hydrogen atmosphere to yield 16α-alkoxy-17a-oxa-D-homo-5α-androstane-3,17-dione, which are new compounds of this invention.

In addition to the foregoing, an alternate procedure may be employed to yield the new final products of this invention. It has now been found that one of the compounds of this invention, namely, 16α-alkoxytestololactone, can be prepared from 16α-hydroxyandrostenedione by first alkylating 16α-hydroxyandrostenedione as by treatment with an alkyl halide, such as methyl iodide or ethyl iodide, to produce 16α-alkoxyandrostenediones, and subjecting the latter to the action of a microorganism of the genus Trichosporon or to the action of the enzymes thereof under oxidizing and preferably aerobic conditions; and further that this new compound may be reduced to another of the compounds of this invention, namely 16α-alkoxy-17a-oxa-D-homo-5α-androstane-3,17-dione, as by treatment with a catalyst, such as palladium on charcoal, in a hydrogen atmosphere.

The microorganism of the genus Trichosporon which may be preferably employed in the practice of this invention is *Trichosporon beigelii*.

To prepare the compounds of this invention, 16α-alkoxyandrostenedione may be subjected to the action of enzymes of a microorganism of the genus Trichosporon under oxidizing conditions. This oxidation can best be effected either by including 16α-alkoxy androstenedione in an aerobic culture of the microorganism, or by bringing together in an aqueous medium, the compounds, air and enzymes of non-proliferating cells of the microorganism.

In general, the conditions of culturing the Trichosporon microorganism for the purposes of this invention are (except for the inclusion of 16α-alkoxy androstenedione to be converted), the same as those of culturing various other microorganisms for the production of antibiotics, vitamin B–12, and other like substances. The microorganism is grown aerobically in contact with (in or on) suitable fermentation medium. A suitable medium essentially comprises a source of carbon and energy. The latter may be a carbohydrate, for example, molasses, glucose, maltose, starch or dextrin, a fatty acid, a fat and/or the compound itself. Preferably, however, the medium includes an assimilable source of carbon and energy in addition to the steroid. Among the fats utilizable for the purpose of this invention are lard oil, soybean oil, linseed oil, cottonseed oil, peanut oil, coconut oil, corn oil, castor oil, sesame oil, crude palm oil, fancy mutton tallow, sperm oil, olive oil, tristearin, tripalmitin, triolein and trilaurin. Among the fatty acids utilizable for the purpose of this invention are stearic acid, palmitic acid, oleic acid, linoleic acid and myristic acid.

The source of nitrogenous factors utilizable for the purposes of this invention may be organic (e.g., soybean meal, cornsteep liquor, yeast extract, meat extract and/or distillers' solubles) or synthetic (i.e., composes of simple, synthesizable organic or inorganic compounds, such as ammonium salts, alkali nitrates, amino acids or urea).

An adequate sterile air supply should be maintained during fermentation, for example, by the conventional methods of exposing a large surface of the medium to air or by utilizing submerged aerated culture. The compound may be added to the culture during the incubation period, or included in the medim prior to sterilization or inoculation. The preferred (but not limiting) range of the concentration of the compound in the culture is about 0.01% to about 0.1%. The culture period (or rather the time of subjecting the compound to the action of the enzyme) may vary considerably, the range of about 24 to 96 hours being feasible, but not limiting.

This alternate microbial process yields inter alia 16α-alkoxy testololactone and additionally upon further processing yields small quantites of 16α-alkoxytestosterone. 16α-alkoxytestololactone may be further processed to yield the 16α-alkoxy-17a-oxa-D-homo-5α-androstane-3,17-diones, which are also new products of this invention. To obtain these new A-ring saturated compounds, the 16α-alkoxytestololactones are reduced, as by treatment with a catalyst, such as palladium on charcoal, in a hydrogen atmosphere.

The invention may be illustrated by the following examples:

EXAMPLE 1

16α-Methoxy-Δ¹-Testololactone 1.50 g. of 16α-hydroxy-Δ¹-testololactone is dissolved in 35 ml. of methyl iodide. After the addition of 1.50 g. of freshly prepared silver oxide, the solution is heated under reflux for five hours. The inorganic salts are then removed by filtration and the solvent reagent is removed in vacuo. The crude crystalline residue obtained is recrystallized from acetone hexane to yield 1.39 g. of 16α- methoxy-Δ¹-testololactone having a melting point of about 203–206° C.;

$\lambda_{max}^{Nujol}$ 5.70, 6.00, 6.15, 6.22, 8.80, 9.11, 9.70, 10.58, 10.99 and 12.01μ.

*Analysis.*—Calcd. for $C_{20}H_{26}O_4$: C, 72.70; H, 7.93. Found: C, 72.83; H, 8.01.

Similarly, following the procedure set forth in Example 1 but substituting ethyl iodide for methyl iodide, yields 16α-ethoxy-Δ¹-testololactone.

EXAMPLE 2

16α-Methoxytestololactone

A. 16α-METHOXY ANDROSTENEDIONE

Following the procedure set forth in Example 1 but substituting 16α-hydroxy androstenedione for 16α-hydroxy-Δ¹-testololactone yields 16α-methoxyandrostenedione.

Similarly, when following Example 1 in the treatment of 16α-hydroxyandrostenedione, if ethyl iodide is substituted for methyl iodide, 16α-ethoxyandrostenedione is obtained.

B. FERMENTATION

A fermentation medium of the following composition is prepared:

| | G. |
|---|---|
| Glucose | 20 |
| Yeast extract | 5 |
| Peptone | 5 |
| Tryptone | 5 |
| $CaCO_3$ | 2.5 |

Water to make 1 liter.

Fifty ml. portions of the medium are distributed in 250 ml. Erlenmeyer flasks, the flasks plugged with cotton and sterilized by autoclaving for 30 minutes at 120° C. When cool, two of the flasks are each inoculated with 1 ml. of a suspension of the surface growth of 7-day old agar slant (10 g. glucose; 3.0 g. malt extract; 5 g. tryptone; 20 g. agar; distilled water to 1 liter) culture of *Trichosporon beigelii* (ATCC 14905), the suspension being made in 10 ml. of water with 0.01% of sodium lauryl sulfate as a wetting agent.

The flasks are then mechanically shaken for 24 hours at 25° C. on a 360 cycle per minute rotary shaker, after which about 5% (v./v.) is transferred to each of 12 flasks each containing 50 ml of the fresh sterile fermentation medium described above. After 72 hours of incubation, 5% (v./v.) is transferred to each of 55 flasks, each containing 50 ml. of the fresh sterile fermentation medium described above. 16α-methoxyandrostenedione is then added by supplementing each flask with 0.25 ml. of a sterile solution of the steroid in anhydrous methanol so that the medium contains 0.25 mg./ml. of the steroid. The flasks are then incubated about an additional 72 hours, after which the flasks are harvested and the contents filtered.

C. ISOLATION OF 16α-METHOXYTESTOLOLACTONE

The thus obtained culture filtrate is then extracted with chloroform, the solvent removed invacuo and the resulting crude residue is triturated with hexane to remove oils. The dry residue, weighing 453 mg. is then chromatographed on aluminum oxide. Elution of the column with chloroform/benzene 1:3 yields 150 mg. of 16α-methoxytestololactone, having a melting point of about 242–245° C.; $[\alpha]_D^{26}$ +38° 10.35 chlf.;

$\lambda_{max}^{EtOH}$ 239μ; ε max., 17,300; $\lambda_{max}^{Nujol}$ 5.77, 6.02, 6.19, 8.30, 8.83, 9.10 and 10.50

*Analysis.*—Calcd. for $C_{20}H_{28}O_4$; C, 72.26; H, 8.49; $CH_3O$, 9.33. Found: C, 72.28; H, 8.40; $CH_3O$, 9.35.

Similarly, following the procedure set forth in Example 2, parts B and C, but substituting 16α-ethoxyandrostenedione for 16α-methoxyandrostenedione yields 16α-ethoxytestololactone.

EXAMPLE 3

16α-Methoxytestosterone

The procedure set forth in Example 2, parts A, B and C is followed with the exception that in part C, elution of the chromatographed column is continued with chloroform/benzene 2:3 to yield 90 mg. of 16α-methoxytestosterone, having a melting point of from about 212° to about 214° C.

EXAMPLE 4

16α-Methoxy-17a-Oxa-D-Homo-5α-Androstane-3,17-Dione 100 mg. of 16α-methoxytestololactone is dissolved in 30 ml. 95% ethanol. This solution is then added to 50 mg. of pre-reduced 5% palladium on charcoal, in a hydrogen atmosphere at atmospheric pressure. The absorption of hydrogen corresponds to the reduction of a double bond. The reduced solution is then filtered through a celite pad, the solvent is removed in vacuo, yielding a crude crystalline residue, which after two recrystallizations from acetone/hexane gives 74 mg. of 16α-methoxy-17a-oxa-D-homo-5α-androstane-3,17-dione, having a melting point of about 180–182° C.; $[\alpha]_D^{24}$ −42° (7.20 chlf.);

$\lambda_{max}^{Nujol}$ 5.73, 5.84, 8.30, 8.86, 9.00 and 9.87

*Analysis.*—Calcd. for $C_{20}H_{30}O_4$: C, 71.82; H, 9.04. Found: C, 71.93; H, 9.04.

Similarly, when 16α-ethoxytestololactone is substituted for 16α-methoxytestololactone, and the procedure of Example 4 is followed, 16α-ethoxy-17a-oxa-D-homo-5α-androstane-3,17-dione is obtained.

EXAMPLE 5

16α-Methoxy-17a-Oxa-D-Homo-5α-Androstane-3,17-Dione

Following the procedure set forth in Example 4 but substituting 100 mg. of 16α-methoxy-Δ¹-testololactone for 16α-methoxytestololactone yields 101 mg. of crude 16α-methoxy-17a-oxa-D-homo-5α-androstane-3,17-dione, having a melting point of about 174–177° C. Further recrystallization yields substantially pure 16α-methoxy-17a-oxa-D-homo - 5α - androstane-3,17-dione, substantially identical to that obtained in Example 4.

Similarly, following the procedure of Example 4 but substituting 16α-ethoxy-Δ¹-testololactone for 16α-methoxytestololactone yields 16α-ethoxy-17a-oxa-D-homo-5α-androstane-3,17-dione.

This invention may be variously otherwise embodied within the scope of the appended claims.

What is claimed is:

1. A compound selected from the group consisting of steroids of the formulae

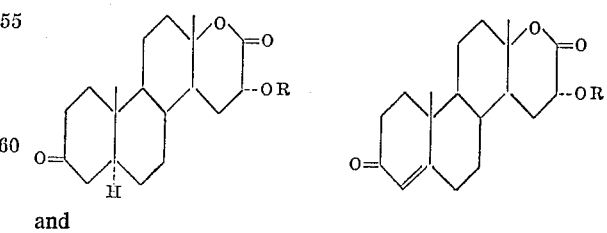

and

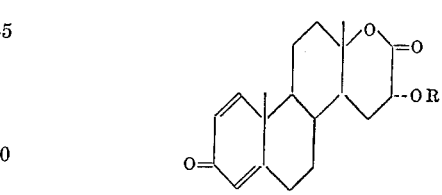

wherein R is lower alkyl.

2. 16α-lower alkoxytestololactone.

3. 16α-lower alkoxy-17a-oxa-D-homo-5α-androstane-3, 17-dione.

4. 16α-lower alkoxy-Δ¹-testololactone.
5. 16α-methoxy - 17a - oxa-D-homo-5α-androstane-3,17-dione.
6. 16α-methoxytestololactone.
7. 16α-methoxy-Δ¹-testololactone.
8. 16-ethoxy - 17a - oxa-D-homo-5α-androstane-3,17-dione.
9. 16α-ethoxytestololactone.
10. 16α-ethoxy-Δ¹-testololactone.

References Cited in the file of this patent

UNITED STATES PATENTS

| | | |
|---|---|---|
| 2,744,120 | Fried et al. | May 1, 1956 |
| 2,760,966 | Knowles | Aug. 28, 1956 |
| 3,056,730 | Laskin | Oct. 2, 1962 |
| 3,060,100 | Wettstein et al. | Oct. 23, 1962 |
| 3,082,217 | Ringold et al. | Mar. 19, 1963 |
| 3,083,212 | Thoma et al. | Mar. 26, 1963 |

FOREIGN PATENTS

| | | |
|---|---|---|
| 792,803 | Great Britain | Apr. 2, 1958 |

OTHER REFERENCES

Migrdichian: Organic Syntheses, Reinhold Pub. Corp., New York, vol. 1 (1957), p. 78.